US010340819B2

(12) United States Patent
Berry et al.

(10) Patent No.: US 10,340,819 B2
(45) Date of Patent: Jul. 2, 2019

(54) FAULT SHUTDOWN CONTROL OF AN ELECTRIC MACHINE IN A VEHICLE OR OTHER DC-POWERED TORQUE SYSTEM

(71) Applicant: GM GLOBAL TECHNOLOGY OPERATIONS LLC, Detroit, MI (US)

(72) Inventors: Daniel J. Berry, Macomb Township, MI (US); Wei D. Wang, Troy, MI (US); Bon Ho Bae, Palo Alto, CA (US); Brian A. Welchko, Oakland, MI (US); Wesley G. Zanardelli, Rochester, MI (US); Melissa R. McNeely, Brighton, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 577 days.

(21) Appl. No.: 15/142,416

(22) Filed: Apr. 29, 2016

(65) Prior Publication Data
US 2017/0317615 A1 Nov. 2, 2017

(51) Int. Cl.
*B60L 3/00* (2019.01)
*B60L 3/04* (2006.01)
*H02H 3/02* (2006.01)
*H02H 7/08* (2006.01)
*H02H 7/09* (2006.01)
(Continued)

(52) U.S. Cl.
CPC .............. *H02P 3/12* (2013.01); *B60L 3/0061* (2013.01); *B60L 3/0069* (2013.01); *B60L 3/04* (2013.01); *H02H 3/023* (2013.01); *H02H 7/0805* (2013.01); *H02H 7/0838* (2013.01);
(Continued)

(58) Field of Classification Search
CPC ....... B61L 29/08; B61L 29/30; B62D 5/0484; B62D 5/0487; H02P 6/085
See application file for complete search history.

(56) References Cited

U.S. PATENT DOCUMENTS 7,400,117 B1 * 7/2008 Rozman .................... H02P 9/10
322/45
2007/0007922 A1 * 1/2007 Sarlioglu ................ H02P 1/029
318/438
(Continued)

FOREIGN PATENT DOCUMENTS

CN 1938937 A 3/2007
CN 103368487 A 10/2013
CN 104362924 A 2/2015

*Primary Examiner* — Shawki S Ismail
*Assistant Examiner* — Zoheb S Imtiaz
(74) *Attorney, Agent, or Firm* — Quinn IP Law

(57) ABSTRACT

A torque system includes a DC power device, a polyphase electric machine, a contactor pair, a power inverter module (PIM), and a controller. The PIM connects to the power device via the contactor pair and directly connects to the electric machine. The controller executes a method to control a fault response under a fault condition resulting in opening of the contactor pair and a polyphase short condition. The controller calculates a back EMF of the electric machine and transmits switching control signals to semiconductor switches of the PIM to transition from the polyphase short condition to a polyphase open condition only when the calculated back EMF is less than a calibrated value and a voltage rise on a DC side of the PIM is less than a calibrated voltage rise. A vehicle includes the DC power device, road wheels, electric machine, PIM, and controller.

11 Claims, 2 Drawing Sheets

(51) Int. Cl.
*H02P 3/12* (2006.01)
*H02P 29/024* (2016.01)

(52) U.S. Cl.
CPC ............ *H02P 29/024* (2013.01); *H02H 7/09* (2013.01); *Y02T 10/642* (2013.01)

(56) References Cited

U.S. PATENT DOCUMENTS

| | | | |
|---|---|---|---|
| 2008/0304189 A1* | 12/2008 | Tang | H02H 7/0838 361/33 |
| 2011/0080149 A1 | 4/2011 | Fukuta et al. | |
| 2011/0309777 A1* | 12/2011 | Welchko | B60L 3/04 318/376 |
| 2012/0126733 A1* | 5/2012 | El-Refaie | H02P 27/08 318/400.26 |
| 2014/0119067 A1* | 5/2014 | Choi | G01R 31/028 363/37 |
| 2016/0211781 A1* | 7/2016 | Jiang | H02P 6/08 |
| 2017/0257043 A1* | 9/2017 | Lorilla | H02P 6/17 |
| 2017/0302263 A1* | 10/2017 | Xu | H02M 1/08 |
| 2017/0317615 A1* | 11/2017 | Berry | B60L 3/04 |

* cited by examiner

US 10,340,819 B2

FAULT SHUTDOWN CONTROL OF AN ELECTRIC MACHINE IN A VEHICLE OR OTHER DC-POWERED TORQUE SYSTEM

TECHNICAL FIELD

The present disclosure relates to automatic shutdown control in response to an open contactor fault in a vehicle or other direct current (DC)-powered torque system.

BACKGROUND

An electrified powertrain of a battery electric vehicle, power plant, or other torque system typically includes at least one high-voltage electric machine. The electric machine draws electrical power from a direct current (DC) power supply such as a battery pack or a fuel cell. The energized electric machine, when embodied as an electric traction motor or a motor/generator unit, can deliver motor torque to various gear sets of a transmission. A boost converter may be used in some designs to increase the battery output voltage to a level suitable for use by the electric machine.

An electric machine of the type typically employed in high-voltage torque-generating systems is typically embodied as a polyphase device, and therefore conversion of the DC output voltage of the DC device is necessary. For this reason, a power inverter module or PIM having semiconductor switches, e.g., IGBTs or MOSFETs, is electrically connected between the DC power supply and the electric machine. The semiconductor switches are automatically controlled via switching signals from a motor controller. Operation of the PIM ultimately converts the boosted DC output voltage into an AC output voltage, which is then applied to the individual phase windings of the electric machine. The energized electric machine produces motor torque suitable for driving the system or recharging the various cells of the battery pack depending on the configuration of the powertrain and operating mode.

SUMMARY

A direct current (DC)-powered torque system is disclosed herein that includes a DC power supply, a polyphase electric machine having an output shaft, a power inverter module (PIM) that, in an electrical sense, is selectively connected to the DC power supply via a contactor pair and directly connected to the electric machine, and a controller. The controller is programmed to provide a more robust shutdown methodology in response to a predetermined fault condition.

In a particular example embodiment, the controller is programmed to execute a control action with respect to the DC-powered torque system in response to a predetermined fault condition that results, as a starting point of the present approach, in the opening of the contactor pair and a polyphase short condition of the semiconductor switches of the PIM. The control action includes calculating a back electromotive force (back EMF) of the electric machine and transmitting switching control signals to the semiconductor switches to transition from the polyphase short condition to a polyphase open condition only when the calculated back EMF is less than a calibrated value and the voltage rise on a DC side of the PIM is less than a threshold voltage rise.

A vehicle is also disclosed that includes the DC power supply, a set of road wheels, a three-phase electric machine, the contactor pair, the PIM, and the controller noted above. The electric machine has an output shaft operable for transmitting an output torque to the road wheels to thereby drive the road wheels and propel the vehicle.

A method of controlling the DC torque system includes detecting the predetermined fault condition via the controller, calculating the back EMF of the electric machine, and transmitting switching control signals from the controller to the semiconductor switches of the PIM to thereby transition from the three-phase short condition to a three-phase open condition only when the calculated back electromotive force is less than the calibrated value and the voltage rise on a DC side of the PIM is less than a threshold voltage rise.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Figure 1:
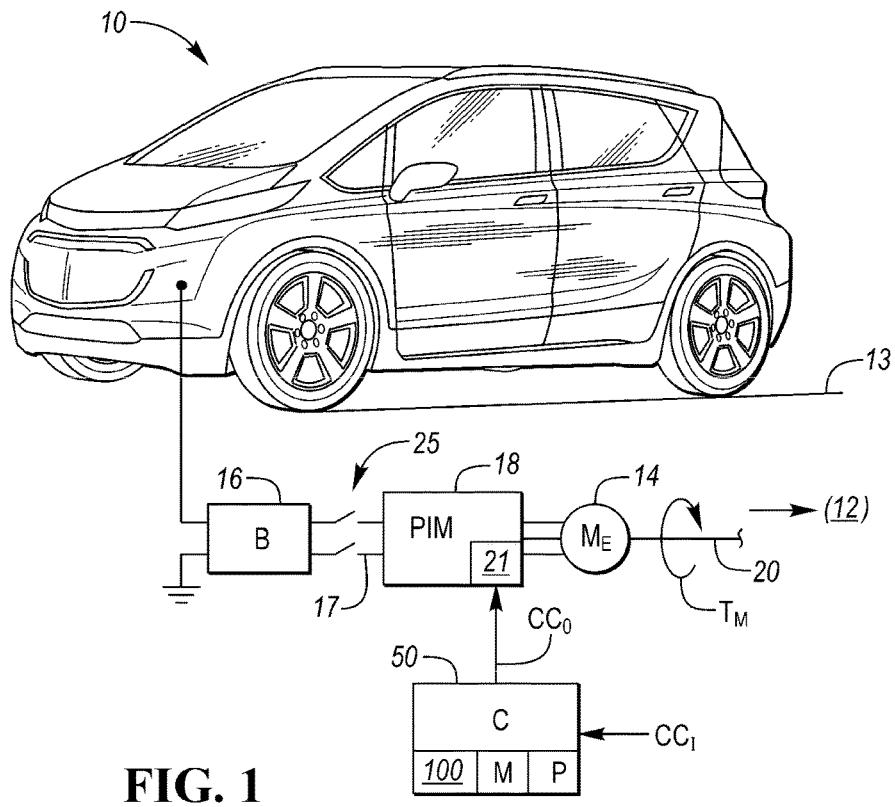
FIG. 1 is a schematic illustration of a DC torque system in the form of an example vehicle having a power inverter module (PIM) and a controller programmed with logic for executing an open-contactor fault shutdown method as set forth herein.

Referring to the drawings, wherein like reference numbers refer to like components throughout the several views, a direct current (DC)-powered torque system 10 is shown schematically in FIG. 1 in the form of a non-limiting example motor vehicle, e.g., having road wheels 12 in rolling contact with a road surface 13. While the control problem addressed herein is most prevalent in road vehicles or other powered systems in which noise, vibration, or oscillation is perceptible by an operator during a coast-down maneuver from high speed, the approach is not limited to use in motor vehicles. Stationary power plants, appliances, and other vehicles such as boats, trains, or aircraft using an electric machine 14 may benefit, and therefore the term "DC-powered torque system" may apply to any such systems. For illustrative consistency, however, the DC torque system 10 will be described hereinafter as a motor vehicle without limiting the scope of the disclosure to such an embodiment.

The system 10 includes a DC power supply 16, shown here as an example battery pack (B) but which may be embodied as a fuel cell, that is selectively connected to a power inverter module (PIM) 18 on a DC side of the PIM 18 via a DC voltage bus 17 and a contactor pair 25, i.e., high-voltage mechanical switches operable for disconnecting the DC power supply 16 from the rest of the system 10 when set to an open state. The PIM 18 in turn is directly connected to a polyphase electric machine (ME) 14 via an alternating current (AC) voltage bus 19. The PIM 18 includes a plurality of semiconductor switches 21 whose open/closed states are controlled via switching control signals (arrow $CC_O$) from a controller (C) 50, such as a motor control module of the type known in the art. Switching control of the PIM 18 converts a DC voltage output from the DC power supply 16 into an AC voltage output suitable for powering the electric machine 14 or multiple such machines. Semiconductor switching techniques such as pulse-width modulation (PWM) and associated IGBT, MOSFET, or thyristor semiconductor switch designs are well known in the art, and therefore a detailed description of switching techniques and the various possible embodiments of the underlying semiconductor structure is omitted for illustrative simplicity.

The electric machine 14 of FIG. 1 may be embodied as a permanent magnet (PM)-type machine. For instance, the electric machine 14 may be a three-phase synchronous electric machine. The electric machine 14 includes an output shaft 20 that transmits a motor output torque (arrow $T_M$) to power a driven member or a load, e.g., to rotate the road wheels 12 in the example vehicle embodiment of FIG. 1 so as to propel the vehicle.

The controller 50 includes a processor P and a memory M. The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The memory (M) is programmed and the controller 50 is otherwise suitably configured in hardware to control the switching operation of the PIM 18.

Figure 3:
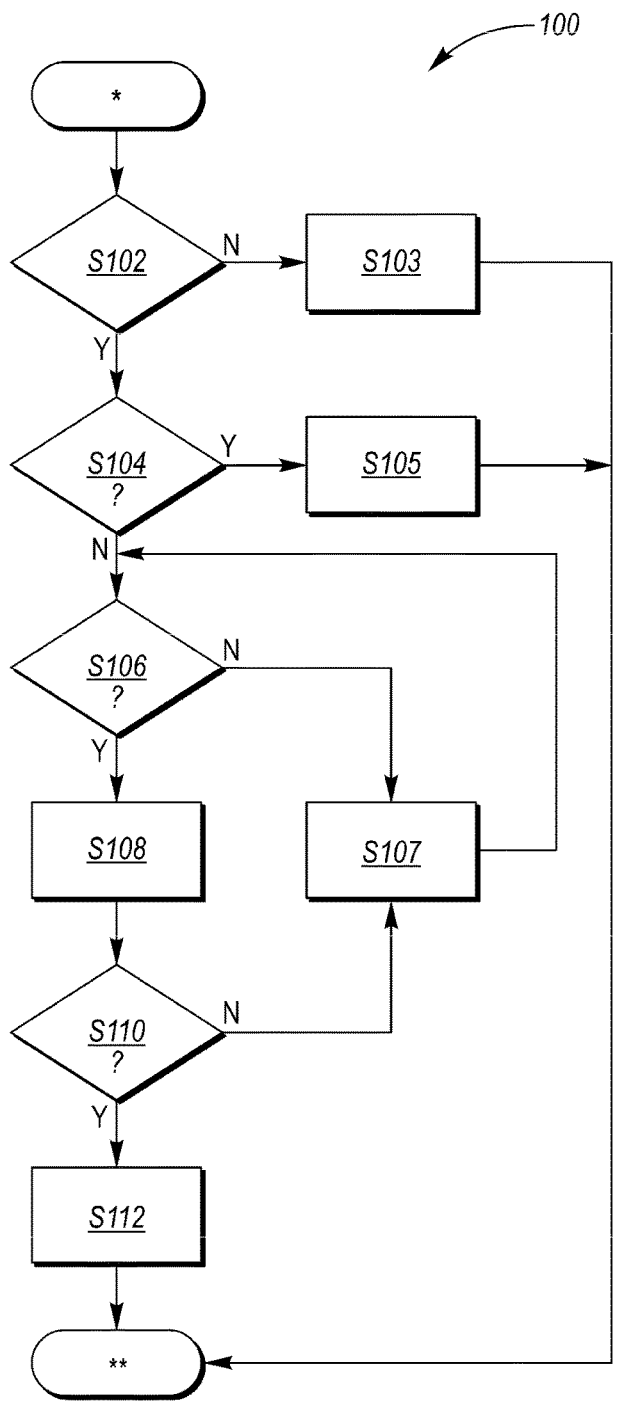
FIG. 3 is a flow chart depicting an example embodiment of the open-contactor fault shutdown method disclosed herein.

In addition to any regular and ongoing switching control operations conducted during operation of the system 10 in which no faults are present, the controller 50 receives an input signal (arrow CO indicative of a predetermined fault condition as part of the method 100. The controller 50 is programmed to execute logic embodying the method 100, an example of which is shown in FIG. 3 and described below, to shut down the system 10 in a controlled manner when the input signals (arrow CO indicate the presence of the predetermined fault condition as explained below.

The contactor pair 25 ordinarily opens automatically whenever the DC-powered torque system 10 is turned off, which has the effect of fully disconnecting the DC power supply 16 from the rest of the system 10. At rare times, however, the contactor pair 25 may open during high speed operation of the electric machine 14 in response to certain electrical faults, such as but not limited to a high-voltage fault, a stuck-open condition of the contactor pair 25, or any other event in which the contactor pair 25 is commanded or forced open during operation of the system 10. When this occurs at higher speeds of the electric machine 14, such as when driving the vehicle of FIG. 1, the controller 50 commands entry into what is known in the art as a polyphase short condition, which is typically a three-phase short condition. In such a condition, all of the semiconductor switches 21 of the PIM 18 are commanded closed. Typically, if the contactor pair 25 is opened, the electric machine 14 will remain in the polyphase short condition so as to avoid inducing voltage spikes on the DC voltage bus 17. In a vehicle application, the vehicle will coast down to zero speed as the power from the DC power supply 16 is no longer available to power rotation of the electric machine 14.

As the rotational speed of the electric machine 14 decreases, eventually a relatively large negative torque may be generated by the electric machine 14. This can cause noise, shudder, or oscillation to occur near zero speed, making a polyphase open condition a more ideal control result during low-speed operation. However, transitioning arbitrarily to the polyphase open condition has the risk of triggering an over-voltage fault due to inductive kickback of the electric machine 14. Therefore, by using the method 100 the controller 50 can ensure that such a transition occurs from the polyphase short condition to polyphase open condition at a predetermined moment in time. To command the transition, the controller 50 transmits the switching control signals (arrow $CC_O$) to the semiconductor switches 21 of the PIM 18. This control action will now be described with further reference to FIG. 2.

Figure 2:
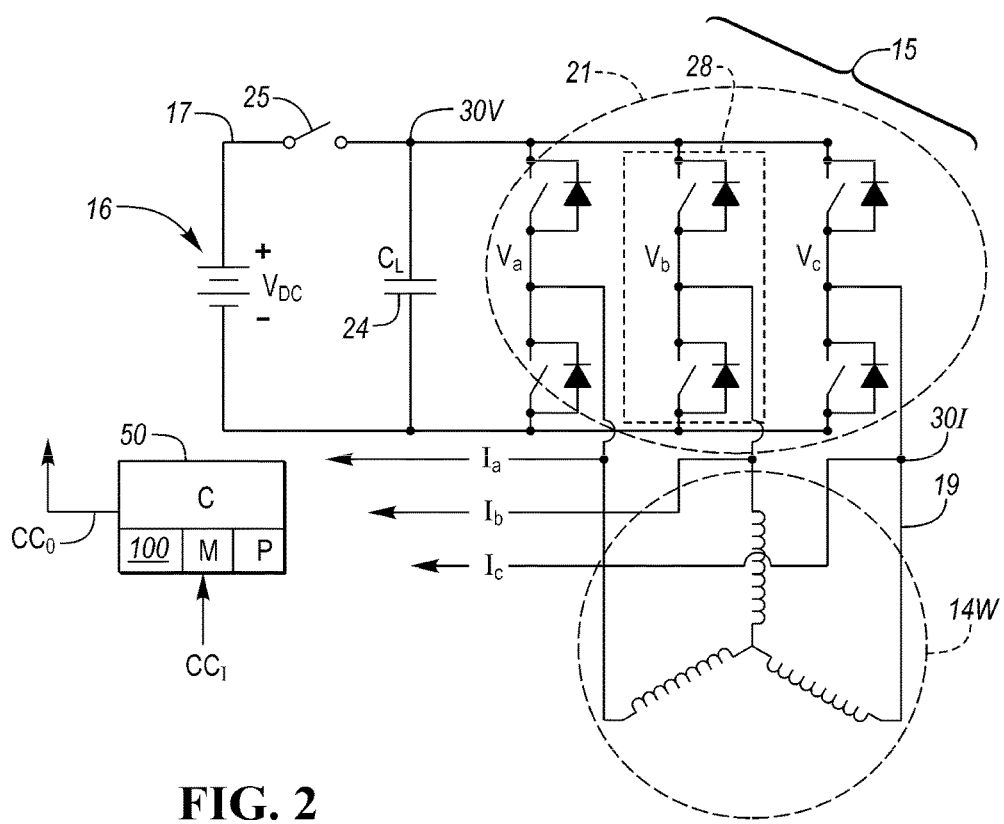
FIG. 2 is a circuit diagram describing operation of the PIM as part of the present methodology.

FIG. 2 depicts via a schematic circuit diagram 15 the electrical components of FIG. 1 that are controlled or evaluated by the controller 50 as part of the method 100. The DC power supply 16 provides a DC output voltage ($V_{DC}$), as noted above, which in common vehicular propulsion embodiments is typically a relatively high voltage such of 300 VDC or more. The contactor pair 25, schematically represented as a single contactor 25 on the schematic DC voltage bus 17, opens to electrically disconnect the DC power supply. The PIM 18 of FIG. 1 also includes a DC link capacitor 24 in electrical parallel with the semiconductor switches 21 and having a capacitance ($C_L$). Each of the semiconductor switches 21 is represented in FIG. 2 as an example IGBT device without limiting the configuration to such a switch design. A voltage sensor 30V may be connected to the DC voltage bus 17 and configured to measure a DC link voltage across the DC link capacitor 24 as explained below with reference to FIG. 3.

The semiconductor switches 21 may include three or more semiconductor switching elements 28, i.e., switching pairs whether housed together or separately, each having a pair of the semiconductor switches 21, otherwise known as upper and lower switches in the art. In a typical three-phase system, each semiconductor element 28 is arranged on a respective phase leg, with phase voltages $V_a$, $V_b$, and $V_c$ indicating the electrical potential across each phase leg, and thus delivered to each of three different phase windings 14W of the electric machine 14 shown in FIG. 1. Corresponding phase currents $I_a$, $I_b$, $I_c$ through the AC voltage bus 19 may be measured on two or three of the respective phase legs, e.g., on or before the phase windings 14W, using a respective current sensor 301. As part of the method 100, the controller 50 may receive the measured phase currents $I_a$, $I_b$, $I_c$ in addition to the input signals (arrow $CC_I$) noted above. Ultimately, the switching control signals (arrow $CC_O$) will turn the individual semiconductor switches 21 on or off as needed, e.g., with either all upper or all lower switches closed in a three-phase short condition and all upper and lower switches opened in a three-phase open condition, with the timing of transition to the three-phase open condition determined via the method 100.

Referring to FIG. 3, the method 100 commences (*) in response to a detected predetermined fault condition. As set forth above, the predetermined fault condition is one that ultimately results in a commanded opening of the contactor pair 25 and initiation of a polyphase short condition. Such a fault condition may be reported to the controller 50 via a master controller (not shown), e.g., a hybrid control module in a vehicle embodiment in which the controller 50 is embodied as a motor control module. Example fault conditions include stuck-open fault condition of the contactor pair 25, a high-voltage fault requiring opening of the contactor pair 25, or any threshold event in which opening of the contactor pair 25 is commanded.

The method 100 continues to step S102, where the controller 50 determined whether the contactor pair 25 of FIGS. 1 and 2 was commanded open or is open, either via receipt of a control message or by direct measurement. The method 100 proceeds to step S104 if the contactor pair 25 has been commanded open, and to step S103 in the alternative if the contactor pair 25 remains closed.

Step S103 entails executing standard control actions, which may include taking speed-dependent actions to command a polyphase short or open condition. With the contactor pair 25 remaining closed, the DC power supply 16 of FIGS. 1 and 2 can absorb excess energy, and thus the vibration problem addressed herein is not present. The method 100 is therefore complete (**) in the event of contactor-closed fault conditions, with other logic addressing such faults outside of the scope of this disclosure.

Step S104 includes determining if circumstances warrant an immediate or more aggressive control action. For example, the controller 50 may detect, or receive as part of the input signals (arrow CO, a message indicative of, a threshold impact event or other high-priority fault condition requiring an immediate control action. In such a case, the method 100 proceeds to step S105. The method 100 proceeds to step S106 if an immediate control action is not required.

At step S106, the controller 50 continues with the present method 100 by determining if a speed of the electric machine 14 is less than a maximum allowable speed. While step S106 may entail measuring the speed of the electric machine 14, such as by estimating speed using an electrical frequency of the electric machine 14. The purpose of step S106 is to determine if the electric machine 14 has sufficiently slowed in preparation for the transition to a polyphase open condition. If the electric machine 14 remains at too high of a speed relative to a speed threshold, the method 100 proceeds to step S107. The method 100 otherwise proceeds to step S108.

Step S107 includes remaining in the polyphase short condition and repeating step S106.

At step S108, the controller 50 of FIGS. 1 and 2 calculates a back electromotive force (EMF) of the electric machine 14, or an "inductive kickback". As is known in the art, with the contactor pair 25 in an open state, energy residing in the electric machine 14 is equal to energy contained in the DC link capacitor 24 of FIG. 2. This relationship can be represented as follows:

$$\tfrac{1}{2}LI^2 = \tfrac{1}{2}C_L(V_{CF}^2 - V_{CI}^2)$$

where L is the inductance of the electric machine 14, which is a known/calibrated value, and I is the measured phase current. $C_L$ is the calibrated DC link capacitance and $V_{CF}$ and $V_{CI}$ are the respective final and initial DC link voltages across the DC link capacitor 24. Controller-provided d-axis and q-axis current commands are provided to the electric machine 14, as is well known in the art of motor controls. Under three-phase short conditions, the electrical current is primarily the d-axis current, and therefore the equation noted above can be reduced to:

$$\tfrac{1}{2}L_d\left(I_d\sqrt{\tfrac{3}{2}}\right)^2 = \tfrac{1}{2}C_L(V_{CF}^2 - V_{CI}^2)$$

with all values measured or calibrated/stored in memory (M) of the controller 50.

Using the above equation, the controller 50 may solve for or predict the final DC link voltage $V_{CF}$ as follows:

$$V_{CF} = \sqrt{\frac{\tfrac{3}{2}L_dI_d^2}{C_L} + V_{CI}^2}$$

This value is then temporarily stored in memory (M) as the method 100 proceeds to step S110.

At step S110, the controller 50 next compares the calculated back EMF, i.e., the final DC link voltage $V_{CF}$, to a calibrated value or threshold, and compares a voltage rise on the DC side of the PIM 18 to a calibrated voltage rise. Step S107 is executed only if the calculated back EMF exceeds the calibrated threshold and the voltage rise on the DC side of the PIM 18 is less than the calibrated voltage rise. Step S112 is executed in the alternative.

Step S112 includes executing a control action with respect to the DC torque system 10 of FIG. 1. Specifically, the controller 50 of FIGS. 1 and 2 transmits the switching control signals (arrow $CC_O$) to the semiconductor switches 21 of FIGS. 1 and 2 to cause a transition to occur from a polyphase short condition to a polyphase open condition. As this control action is commanded only when the calculated back EMF is less than a calibrated value as noted above, inductive kickback is minimized and over-voltage faults that could potentially overload the DC link capacitor 24 of FIG. 2 are largely avoided.

This disclosure may be embodied in many different forms. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

While the best modes for carrying out the disclosure have been described in detail, those familiar with the art to which this disclosure relates will recognize various alternate designs and embodiments within the scope of the appended claims.

The invention claimed is:

1. A direct current (DC)-powered torque system comprising:
   a DC power supply;
   a polyphase electric machine having an output shaft operable for transmitting an output torque;
   a DC voltage bus;
   an alternating current (AC) voltage bus;
   a contactor pair;
   a power inverter module (PIM) having a plurality of semiconductor switches, wherein the PIM is selectively connected to the DC power supply via the contactor pair and the DC voltage bus, and is directly connected to the electric machine via the AC voltage bus;
   a DC link capacitor in electrical parallel with the plurality of semiconductor switches;
   a voltage sensor configured to measure a DC link voltage across the DC link capacitor; and a controller having memory programmed with a set of calibrated values, including an inductance of the electric machine and a DC link capacitance of the DC link capacitor, wherein the controller is programmed to execute a control action with respect to the torque system in response to a predetermined fault condition, wherein the predetermined fault condition results in an opening of the contactor pair and a polyphase short condition, the control action including:

calculating a back electromotive force of the electric machine using the set of calibrated values and the DC link voltage from the voltage sensor; and transmitting switching control signals to the semiconductor switches to transition from the polyphase short condition to a polyphase open condition only when the calculated back electromotive force is less than a calibrated value and a voltage rise on a DC side of the PIM is less than a calibrated voltage rise.

2. The DC-powered torque system of claim 1, wherein the polyphase electric machine is a permanent magnet-type synchronous electric machine.

3. The DC-powered torque system of claim 1, further comprising a driven member or load connected to the output shaft.

4. The DC-powered torque system of claim 1, wherein each semiconductor switch of the plurality of semiconductor switches is an IGBT.

5. The torque system of claim 1, wherein the plurality of semiconductor switches includes three or more semiconductor switching elements each having a pair of the semiconductor switches.

6. A vehicle comprising:
a direct current (DC) power supply;
a set of road wheels;
a three-phase electric machine having an output shaft operable for transmitting an output torque to the set of road wheels to thereby drive the road wheels and propel the vehicle;
a contactor pair;
a DC voltage bus;
an alternating current (AC) voltage bus;
a power inverter module (PIM) having a plurality of semiconductor switches, wherein the PIM is selectively connected to the DC power supply via the DC voltage bus and the contactor pair, and is directly connected to the electric machine via the AC voltage bus;
a DC link capacitor in electrical parallel with the plurality of semiconductor switches;
a voltage sensor configured to measure a DC link voltage across the DC link capacitor; and
a controller having memory programmed with a set of calibrated values, including an inductance of the electric machine and a DC link capacitance of the DC link capacitor, wherein the controller is programmed to execute a control action with respect to the torque system in response to a predetermined fault condition, wherein the predetermined fault condition results in an opening of the contactor pair and a three-phase short condition, the control action including:

calculating a back electromotive force of the electric machine using the set of calibrated values and the DC link voltage from the voltage sensor; and transmitting switching control signals to the semiconductor switches to transition from the three-phase short condition to a three-phase open condition only when the calculated back electromotive force is less than a calibrated value and a voltage rise on a DC side of the PIM is less than a calibrated voltage rise.

7. The vehicle of claim 6, wherein the three-phase electric machine is a permanent magnet-type synchronous electric machine.

8. The vehicle of claim 6, wherein each semiconductor switch of the plurality of semiconductor switches is an IGBT.

9. The vehicle of claim 6, wherein the plurality of semiconductor switches includes three or more semiconductor switching elements each having a pair of the semiconductor switches.

10. A method of controlling a direct current (DC)-powered torque system in response to a predetermined fault condition, wherein the torque system includes a DC power supply, a power inverter module (PIM) connected to the DC power supply via a contactor pair and a DC bus, an electric machine connected to the PIM via an AC bus, a DC link capacitor in electrical parallel with a plurality of semiconductor switches of the PIM, and a voltage sensor configured to measure a DC link voltage across the DC link capacitor, and wherein the predetermined fault condition is a fault resulting in an opening of the contactor pair and a three-phase short condition, the method comprising:

detecting the predetermined fault condition via a controller having memory programmed with a set of calibrated values, including an inductance of the electric machine and a DC link capacitance of the DC link capacitor;

calculating a back electromotive force of the electric machine via the controller using the set of calibrated values and the DC link voltage that is measured by the voltage sensor; and transmitting switching control signals from the controller to a plurality of semiconductor switches of the PIM to thereby transition from the three-phase short condition to a three-phase open condition only when the calculated back electromotive force is less than a calibrated value and a voltage rise on a DC side of the PIM is less than a calibrated voltage rise.

11. The method of claim 10, wherein the function is:

$$V_{CF} = \sqrt{\frac{\frac{3}{2}L_d I_d^2}{C_L} + + V_{CI}^2}$$

where $V_{CF}$ is the back electromotive force, $L_d$ is a d-axis-based inductance of the electric machine, $I_d$ is a d-axis-based current of the electric machine, $C_L$ is the DC link capacitance, and $V_{CI}$ is the DC link voltage at an onset of the transition.

* * * * *